United States Patent
Schleier-Smith et al.

(10) Patent No.: US 9,213,725 B2
(45) Date of Patent: Dec. 15, 2015

(54) SYSTEMS AND METHODS FOR GENERATING AUTOMATED SOCIAL INTERACTIONS IN SOCIAL NETWORKING ENVIRONMENTS

(71) Applicant: Tagged, Inc., San Francisco, CA (US)

(72) Inventors: Johann Schleier-Smith, San Francisco, CA (US); Greg Tseng, Los Altos, CA (US); Jared Kim, San Francisco, CA (US)

(73) Assignee: IFWE INC., San Francisco, CA (US)

( * ) Notice: Subject to any disclaimer, the term of this patent is extended or adjusted under 35 U.S.C. 154(b) by 273 days.

(21) Appl. No.: 13/833,406

(22) Filed: Mar. 15, 2013

(65) Prior Publication Data

US 2013/0311486 A1    Nov. 21, 2013

Related U.S. Application Data

(60) Provisional application No. 61/648,348, filed on May 17, 2012.

(51) Int. Cl.
    *G06F 17/30* (2006.01)
(52) U.S. Cl.
    CPC .... *G06F 17/30283* (2013.01); *G06F 17/30867* (2013.01)
(58) Field of Classification Search
    CPC .......... G06F 17/3053; G06F 17/30867; G06F 17/30283
    USPC .......................................... 707/748, 758, 769
    See application file for complete search history.

(56) References Cited

U.S. PATENT DOCUMENTS

| | | | |
|---|---|---|---|
| 6,263,335 B1 | 7/2001 | Paik et al. | |
| 8,335,754 B2 | 12/2012 | Dawson et al. | |
| 8,490,007 B1 | 7/2013 | Hoffman et al. | |
| 8,640,163 B2 * | 1/2014 | Weare ............... | G06F 17/30035 705/14.53 |
| 8,756,185 B2 | 6/2014 | Dawson et al. | |

(Continued)

FOREIGN PATENT DOCUMENTS

| | | |
|---|---|---|
| JP | 2008-146246 A | 6/2008 |
| JP | 2009-288995 A | 12/2009 |

(Continued)

OTHER PUBLICATIONS

Notice of Allowance mailed Apr. 22, 2014, for U.S. Appl. No. 13/714,937, by Dawson et al. filed Dec. 14, 2012.

(Continued)

*Primary Examiner* — Phong Nguyen
(74) *Attorney, Agent, or Firm* — Perkins Coie LLP

(57) ABSTRACT

Systems and methods of generating automated social interactions for users in a social networking environment are disclosed. In one aspect, embodiments of the present disclosure include a method, which may be implemented on a system, of receiving data items associated with users of a social network, identifying sets of data items associated with a user, and comparing a first set of data items to other sets of data items to identify commonalities between the first set of data items and the other sets of data items. The method further comprising automatically selecting a second user associated with a second set of data items and a first electronic social interaction for the first user to pursue with respect to the second user based on the identified commonalities between the first set of data items and the second set of data items.

24 Claims, 12 Drawing Sheets

(56) References Cited

U.S. PATENT DOCUMENTS

| | | | |
|---|---|---|---|
| 8,763,150 B2* | 6/2014 | Flake | G06F 21/6245 709/223 |
| 2003/0212543 A1 | 11/2003 | Epstein et al. | |
| 2005/0177385 A1 | 8/2005 | Hull et al. | |
| 2005/0182765 A1 | 8/2005 | Liddy | |
| 2005/0198031 A1 | 9/2005 | Pezaris et al. | |
| 2006/0129906 A1 | 6/2006 | Wall | |
| 2007/0192299 A1 | 8/2007 | Zuckerberg et al. | |
| 2007/0214141 A1 | 9/2007 | Sittig et al. | |
| 2007/0219933 A1 | 9/2007 | Datig | |
| 2008/0097974 A1 | 4/2008 | Chen et al. | |
| 2008/0133213 A1 | 6/2008 | Pollara | |
| 2008/0140650 A1 | 6/2008 | Stackpole | |
| 2008/0188261 A1* | 8/2008 | Arnone | H04W 4/02 455/550.1 |
| 2009/0077061 A1* | 3/2009 | Abercrombie, III | G06Q 30/02 707/999.003 |
| 2009/0164387 A1 | 6/2009 | Armstrong et al. | |
| 2009/0228361 A1 | 9/2009 | Wilson et al. | |
| 2009/0287674 A1 | 11/2009 | Bouillet et al. | |
| 2009/0327437 A1 | 12/2009 | Estrada | |
| 2010/0083318 A1* | 4/2010 | Weare | G06F 17/30035 725/46 |
| 2010/0241580 A1* | 9/2010 | Schleier-Smith | G06Q 30/02 705/319 |
| 2010/0257454 A1 | 10/2010 | Lee et al. | |
| 2011/0213787 A1 | 9/2011 | Cerny et al. | |
| 2012/0082401 A1 | 4/2012 | Berger et al. | |
| 2012/0096037 A1 | 4/2012 | Sittig et al. | |
| 2012/0110429 A1 | 5/2012 | Tzonis et al. | |
| 2012/0251079 A1 | 10/2012 | Meschter et al. | |
| 2012/0284341 A1* | 11/2012 | Masood | G06Q 50/01 709/205 |
| 2013/0073985 A1 | 3/2013 | Hamlin et al. | |
| 2013/0159412 A1* | 6/2013 | Robinson | G06F 17/30867 709/204 |
| 2013/0311482 A1 | 11/2013 | Schleier-Smith et al. | |
| 2013/0311560 A1 | 11/2013 | Schleier-Smith et al. | |
| 2014/0019533 A1 | 1/2014 | Sherman et al. | |
| 2014/0181208 A1* | 6/2014 | Robinson | G06F 17/30867 709/204 |
| 2015/0067064 A1* | 3/2015 | Abercrombie, III | G06Q 10/02 709/204 |

FOREIGN PATENT DOCUMENTS

| | | |
|---|---|---|
| JP | 2012-003635 A | 1/2012 |
| KR | 10-2010-0130003 | 12/2010 |
| KR | 10-2012-0035606 | 4/2012 |

OTHER PUBLICATIONS

Non-Final Office Action mailed Feb. 3, 2015, U.S. Appl. No. 13/833,274 of Schleier-Smith, J., et al., filed Mar. 15, 2013.
Non-Final Office Action mailed May 7, 2015, U.S. Appl. No. 13/833,243, of Schleier-Smith, J., et al., filed Mar. 15, 2013.
Final Office Action mailed Sep. 23, 2015, U.S. Appl. No. 13/833,274 of Schleier-Smith, J., et al, filed Mar. 15, 2013.
U.S. Appl. No. 13/714,937, of Dawson et al. filed Dec. 14, 2012.
U.S. Appl. No. 13/833,243, of Schleir-Smith, J., et al., filed Mar. 15, 2013.
U.S. Appl. No. 13/833,274 of Schleir-Smith, J., et al., filed Mar. 15, 2013.
International Search Report and Written Opinion mailed Aug. 19, 2013 for International Patent Application No. PCT/US13/41684 filed filed May 17, 2013.
International Search Report and Written Opinion mailed Aug. 19, 2013 for International Patent Application No. PCT/US13/41690 filed filed May 17, 2013.
International Search Report and Written Opinion mailed Aug. 19, 2013, for International Patent Application No. PCT/US13/41663 filed May 17, 2013.
Restriction Requirement mailed Aug. 28, 2012 for U.S. Appl. No. 12/718,692, filed May 5, 2010.
Notice of Allowance mailed Oct. 19, 2012 for U.S. Appl. No. 12/718,692, filed May 5, 2010.
Non-Final Office Action mailed Nov. 7, 2013 for U.S. Appl. No. 13/714,937, by Dawson et al. filed Dec. 14, 2012.
Notice of Allowance mailed Mar. 6, 2014, for U.S. Appl. No. 13/714,937, by Dawson et al. filed Dec. 14, 2012.
Banko, Michele et al.; "Open Information Extraction from the Web"; International Joint Conference on Artificial Intelligence Proceedings 2007; pp. 2670-2676; 2007.
Dichev, Christo and Dicheva, Darina; "View-Based Semantic Search and Browsing"; Proceedings of the 2006 IEEE! WIC/ACM International Conference on Web Intelligence; 2006.
Farzindar, Atefeh, Lapalme, Guy and Saggion, Horacio; Summaries with SumUM and its Expansion for Document Understanding Conference (DUC 2002); Workshop on Text Summarization; 2002.
Gelfand, Boris, Wulfekuhler, Marilyn and Punch, William F. III; "Automated Concept Extraction From Plain 25 Text"; Mai Technical Report WS-98-05; pp. 13-17; Association for the Advancement of Artificial Intelligence (AMI), USA; 1998.
Hammond, Brian, Sheth, Amit and Kochut, Krzysztof; "Semantic Enhancement Engine: A Modular Document Enhancement Platform for Semantic Applications over Heterogeneous Content"; Real World Semantic Web Applications; pp. 29-49; IOS Press; 2002.
Leake, David B. et al.; "Aiding Knowledge Capture by Searching for Extensions of Knowledge Models"; Second International Conference on Knowledge Capture; KoCAP'03, Oct. 23-25, 2003, Sanibel Island, Florida, USA; 2003.
Leake, David B., Maguitman, Ana and Reich Herzer, Thomas; "Topic Extraction and Extension to Support Concept Mapping"; Proceedings of FLAIRS-03; AAAI Press, Saint Augustine, FL, USA; 2003.
Leskovec, Jure, Grobelnik, Marko and Milic-Frayling, Natasa; "Learning Semantic Sub-graphs for Document Summarization"; Proceedings of the 7th International Multi-Conference Information Society is 2004; vol. B; 2004.
Leuski, Anton, Lin, Chin-Yew and How, Eduard; "iNeATS: Interactive Multi-Document Summarization"; Proceedings of the 41st Annual Meeting on Association for Computational Linguistics; pp. 125-128; vol. 2; Association for Computational Linguistics Morristown, NJ, USA; 2003.
Maisonnasse, Loic, Gaussier, Eric & Chevallet, Jean-Pierre; "Multi-Relation Modeling on Multi Concept Extraction"; Cross Language Evaluation Forum 2008; Working Notes for the CLEF 2008 Workshop, Denmark; 2008.
Merlo, Paola et al.; "Learning Document Similarity Using Natural Language Processing"; Linguistik Online; 17, 5/03; Europa-Universitat Viadrina in Frankfurt et al.; 2003.
Nazar, Rogelio, Vivaldi, Jorge and Wanner, Leo; "Towards Quantitative Concept Analysis"; Procesamiento del Lenguaje Natural;pp. 139-146; n039; Sociedad Espanola para el Procesamiento del Lenguaje Natural. Spain; 2007.
Poibeau, Thierry, Arcouteil, Alexandre and Grouin, Cyril; "Recycling an Information Extraction system to automatically produce Semantic Annotations for the Web"; Proceedings of the ECAI 2002 Workshop on Semantic Authoring, Annotation & Knowledge Markup; 2002.
Rajaraman, Kanagasabai and Tan, Ah-Hwee; "Knowledge Discovery from Texts: A Concept Frame Graph Approach"; Proceedings of the Eleventh International Conference on Information and Knowledge Management; pp. 669-671; ACM, New York, NY, USA; 2002.
Reichherzer, Thomas and Leake, David; "Towards Automatic Support for Augmenting Concept Maps With Documents"; 2nd International Conference on Concept Mapping; 2006.
Rusu, D. et al.; "Semantic Graphs Derived From Triplets with Application in Document Summarization"; Proceedings 23 of the 11th International Multiconference "Information Society-IS 2008"; pp. 198-201; 2008.
Saggion, Horacio and Lapalme, Guy; "Concept Identification and Presentation in the Context of Technical Text Summarization"; Proceedings of the Workshop on Automatic Summarization; pp. 1-10; Association for Computational Linguistics Morristown, NJ, USA; 2000.

(56) References Cited

OTHER PUBLICATIONS

Tifi, Alfredo and Lombardi, Antonietta; "Collaborative Concept Mapping Models"; Proc. of the Third Inl. Conference on Concept Mapping; 2008.

Valerio, Alejandro and Leake, David B.; "Associating Documents to Concept Maps in Context"; Proc. of the Third Inl. Conference on Concept Mapping; Tallinn, Estonia & Helsinki, Finland; 2008.

Valerio, Alejandro and Leake, David; "Jump-Starting Concept Map Construction With Knowledge Extracted From Documents"; Proc. of the Second In!. Conference on Concept Mapping; San Jose, Costa Rica; 2006.

Valerio, Alejandro, Leake, David and Canas, Alberto J.; "Automatically Associating Documents with Concept Map Knowledge Models"; 33rd Latin American Conference in Informatics (CLEI 07); 2007.

Vallet, David et al.; "A contextual personalization approach based on ontological knowledge"; 17th European Conference on Artificial Intelligence (ECAI 2006); 2006.

Wafula, Belinda Ng'asia; "Automatic Construction of Concept Maps"; online: <<http://www.cs.joensuu.fi/pages/whamalai/sciwri/belinda.pdf>>; 2006.

Zhang, Haiqin et al.; "A Study for Documents Summarization based on Personal Annotation"; Proceedings of the HL T-NAACL 03; pp. 41-48; vol. 5; Association for Computational Linguistics Morristown, NJ, USA; 2003.

Zouaq, Amal, Nkambou, Roger and Frasson, Claude; "Document Semantic Annotation for Intelligent Tutoring Systems: a Concept Mapping Approach"; FLAIRS 2007 Proceedings; 2007.

Final Office Action mailed Oct. 15, 2015, U.S. Appl. No. 13/833,243, of Schleier-Smith, J., et al., filed Mar. 15, 2013.

\* cited by examiner

Common Data Items

| ID | Overlapping Indicator | User Rank | Data Item Type | Type Weight | Data Item Description |
|---|---|---|---|---|---|
| A1/B1 | 2007-2010 | 1 | Personal Profile Item | .8 | Lived in San Francisco |
| A2/B2 | 2007 | 1 | Action | .5 | Liked San Francisco Forty-Niners |
| A4/B3 | 03/2008 | 1 | Communication | 1.0 | Sent User B a Message |

*FIG. 5*

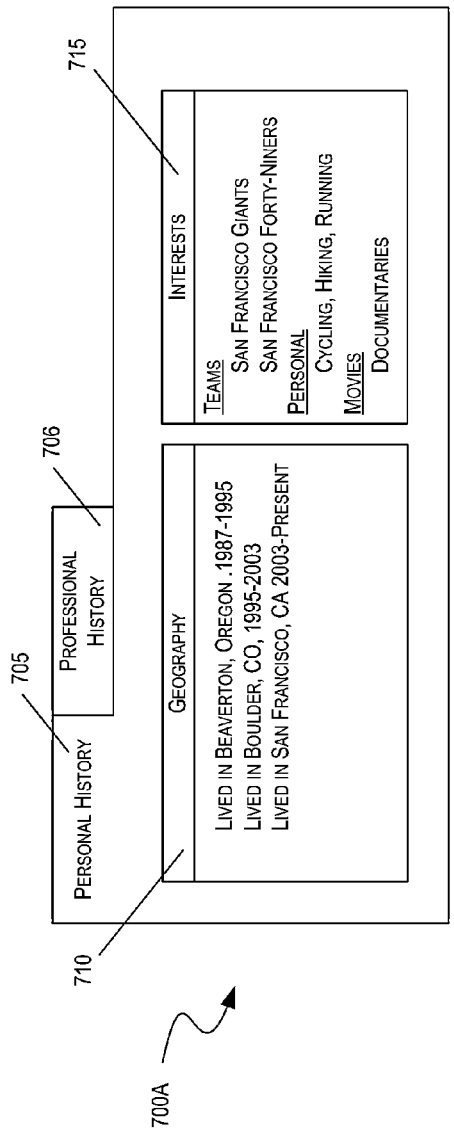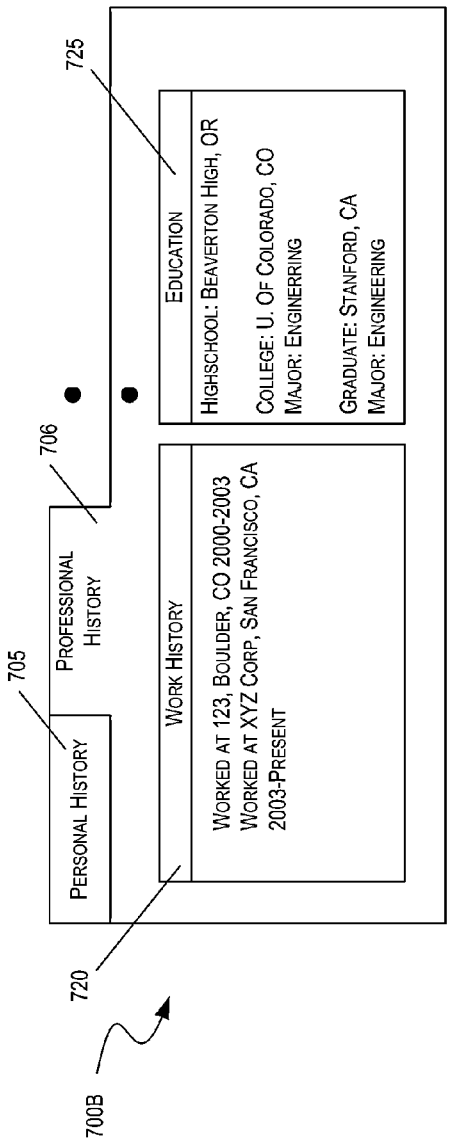
FIG. 7A
FIG. 7B

800

802 — Home | Profile ▶ | Friends ▶ | Messages ▶ | Browse | Search          account | help | support Photos • Video • Poker • Chat • Tags • Luv • Wink • Meet Me • Pets • SuperPoke • More...

Jump to ..... ▶

Add Photos
Add a Widget
Add Videos
Write in Journal

Edit Profile
Change Skin
New Box
Friend's View 512        0%

○ Jane D

Jane D is playing meet me! 1 hour ago  edit  clear    — 804

Profile URL:        http://www.tagged.com/
                    Select a URL           Save Last Active:        Online now!
Profile Views:      0 times
Profile Skin:       Default
Tagline:            Select...

Gender:             Female
Location:           Menlo Park, CA
Birthdate:          October 17
Relationship Status: Select...
Interested In:      Friends, Networking
Languages:          German, English
Orientation:        Straight Junior High School: Boston University Academy
High School:        David Starr Jordan Sr. High '91
College:            Santa Barbara City College 95

806

About Me

Music:          Add your favorite music types and artists...
Movies:         Add your favorite movies and actors...
TV:             Add your favorite TV shows...
Books:          Add your favorite books and authors...
Sports:         Add your favorite sports, teams, & athletes...
Interests:      Add your interests...
Dreams:         Share your dreams...
Best Features:  Don't be shy...
About Me:       Write anything you want...
Add more fields...

808

What's New                                          Display 10 ▶

View all updates
Jane D updated her profile information. 1:36pm          X
Jane D is playing meet me! 1:30pm                       X
Jane D added a new photo. 1:24pm                        X

Photos                                              Display 10 ▶

View all 1 photos • Add Photos • Make a Slideshow

Friends                                             Display 10 ▶

No friends • Invite Friends

Gifts                                               Autoplay Off ▶

No gifts

Videos                                              Display 8 ▶

No videos • Add Videos

Tags                                                Display 2 ▶

No tags

Journals

No journal entries • Write in Journal

*FIG. 8*

SYSTEMS AND METHODS FOR GENERATING AUTOMATED SOCIAL INTERACTIONS IN SOCIAL NETWORKING ENVIRONMENTS

CLAIM OF PRIORITY

This application claims priority to U.S. Provisional Patent Application No. 61/648,348 entitled "SYSTEMS AND METHODS FOR GENERATING AUTOMATED SOCIAL INTERACTIONS IN SOCIAL NETWORKING ENVIRONMENTS," which was filed on May 17, 2012, the contents of which are expressly incorporated by reference herein.

CROSS-REFERENCE TO RELATED APPLICATION

This application is related to co-pending U.S. patent application Ser. No. 13/833,243, entitled "MULTI-USER TIMELINE FOR FACILITATING SOCIAL DISCOVERY IN SOCIAL NETWORKING ENVIRONMENTS", which has been concurrently filed on even date herewith, the contents of which are expressly incorporated by reference herein.

This application is related to co-pending U.S. patent application Ser. No. 13/833,274, entitled "SOCIAL DISCOVERY FEED FOR FACILITATING SOCIAL EXPLORATION IN SOCIAL NETWORKING ENVIRONMENTS", which has been concurrently filed on even date herewith, the contents of which are expressly incorporated by reference herein.

BACKGROUND

Social networks in online environments are increasingly relied upon by individuals to engage and participate in various types of social activities and behaviors. For example, individuals use online social networks to facilitate friendly, casual, romantic, business relationships and to maintain connections and initiate dialogues with others. With the prevalence of high speed network connections to the Internet and the availability of mobile devices with wireless capabilities, the online environment has become one of the dominating mechanisms through which people communicate and connect with one another.

For example, online social networks are increasingly used by many individuals of all ages and demographic groups to stay in touch and to stay connected with existing friends, family members, and business colleagues. Further, online social networks are also increasingly being used to build connections, acquaintances, or potential business partners. Via these online social networks, users can join common interest groups, meet others with similar interests, and/or have access to updated contact information for contacts, friends, and/or acquaintances. The vast and continuously growing user-base of online social networks further enhances the user's experience. However, the amount of relationship data and interaction data that users can collect and utilize makes finding and nurturing new social connections increasingly burdensome.

BRIEF DESCRIPTION OF THE DRAWINGS

FIG. 5 depicts a table illustrating an example of data items that are common to a first user and a second user, according to one embodiment.

FIG. 7A and FIG. 7B illustrate example user interfaces showing user-profile pages for entering personal history and professional history, respectively, according to one embodiment.

FIG. 8 illustrates an example user interface showing a user-profile page, according to one embodiment.

DETAILED DESCRIPTION

Figure 1:
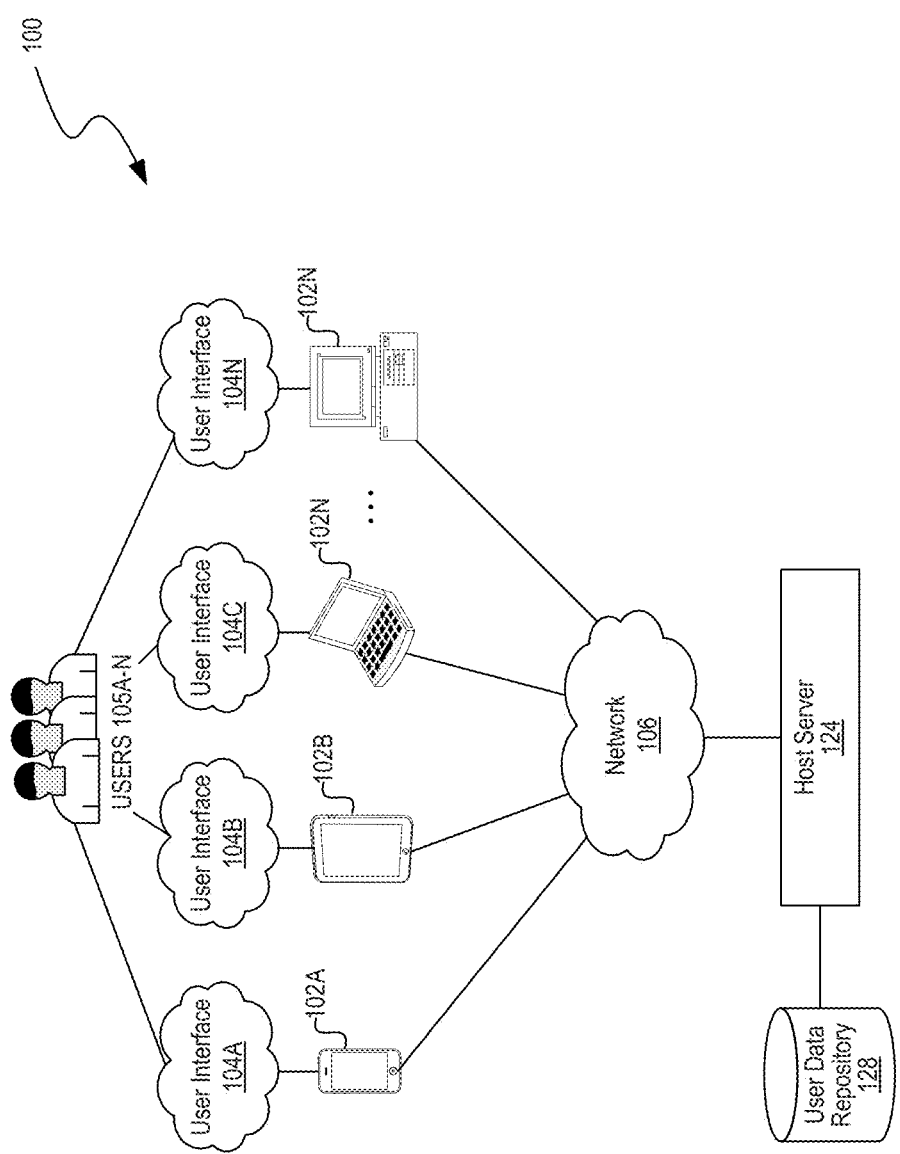
FIG. 1 illustrates a block diagram of client devices or user devices able to communicate with the host server for generating automated social interactions in social networking environments, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for generating automated social interactions for users in social networking environments. More specifically, the techniques introduced herein provide for systems and methods for generating suggested actions to take with respect to other users of the social network to facilitate social interactions and new social connections amongst the users of the web-based social network. For example, in one embodiment, a host server may identify commonalities between a first user and a second user and subsequently prompt the first user to introduce himself/herself to the second user based on the identified commonality.

In one embodiment, the commonality between the first user and the second user can be based on comparing a plurality of data items associated with the users and determining which users have common data items. Among other things, the data items can indicate profile information associated with a user, messages sent and/or received by the user, and/or actions taken by or acted upon a user.

The commonalities can be indications of the same or similar public or private profile information such as, for example, users having indicated in their profiles that they lived or worked at the same place, or users having indicated in their profiles the same (or similar) fan status (e.g., both users like the San Francisco Giants). Commonalities can also be based on indications of past engagements through communications or messages between the users. The messages can be, for example, any text-based message sent via the social networking interface including, but not limited to, email messages and/or chat messages. Similarly, commonalities can be based on indications of past actions common among the users. The actions can be electronic events initiated by the user within the social networking environment. For example, a user may send to another user: an indication that the user would like to meet the other user, an indication that the user liked something (e.g., a picture of the other user), an indication of a virtual gift (e.g., a virtual monetary or virtual collectable), an indication of a non-text based communication (e.g., a wink), and/or an indication that a user tagged another user.

FIG. 1 illustrates a block diagram of client devices or user devices 102A-N able to communicate with the host server 124 for generating automated social interactions in a social networking environment 100, according to one embodiment.

The plurality of client devices or user devices 102A-N can be any system and/or device, and/or any combination of devices/systems that is able to establish a connection with another device, a server and/or other systems. The client devices or user devices 102A-N typically include display or other output functionalities to present data exchanged between the devices to a user. For example, the client devices can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In one embodiment, client devices or user devices 102A-N are coupled to a network 106. In some embodiments, the devices 102A-N may be directly connected to one another.

The network 106, over which client devices or user devices 102A-N and the host server 124 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc. The network 106 can be any collection of distinct networks operating wholly or partially in conjunction to provide connectivity to the client devices or user devices 102A-N and host server 124 and may appear as one or more networks to the serviced systems and devices. In one embodiment, communications to and from client devices or user devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The user data repository 128 can store software, descriptive data, images, system information, drivers, and/or any other data item utilized by other components of the host server 124 and/or any other servers for operation. The user data repository 128 may be coupled to the host server 124. The user data repository 128 may be managed by a database management system (DBMS), for example but not limited to, Oracle, DB2, Microsoft Access, Microsoft SQL Server, PostgreSQL, MySQL, FileMaker, etc. The user data repository 128 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (OR-DBMS) (e.g., Informix, OpenLink Virtuoso, VMDS, etc.), a file system, and/or any other convenient or known database management package.

In some embodiments, the host server 124 is able to provide data to be stored in the user data (or data items) repository 128 and/or can retrieve data stored in the user data repository 128. The user data repository 128 can store static user data and dynamic user data. The status user data can include user information of the users in the online social network. For example, static user data can include descriptive data of current and past personal information such as, but not limited to, a first name and last name of the user, a valid email ID, a unique user name, age, marital status, occupations, locations lived and worked, education, home town, schools attended, number of siblings, heritage, ethnicity, race, etc. The user information further includes interest information, which may include, but is not limited to, activities, hobbies, professional information, photos, etc.

In one embodiment, the user data stored in user data repository 128 is explicitly specified by the user. For example, when the user (e.g., visitor/service subscriber) signs up for services such as social networking related services, a set of information may be required, such as a valid email address, an address of service, a valid credit card number, social security number, a username, and/or age. The user information form can include optional entries, by way of example but not limitation, location, activity, hobbies, ethnicity, photos, etc. Examples of user data stored in the user data repository 128, including, but is not limited to, user name, user occupation/position, user address, subscription information, hardware ID, hardware model, software version ID, etc. The user data may be entered by a user via a profile. In some cases, each user data may include additional information about whether the user information is public and/or private. For example, the information may include privacy information indicating what, if anything, other users of the social network can view with respect to the user data.

The user data repository 128 can also store dynamic user data. Dynamic user data can either be explicitly submitted by the user or provided via one or more software agents and/or hardware modules such as the host server 124 coupled to the user data repository 128. Dynamic user data can be any action or communication initiated by a user of the social network. For example, a user can periodically update his/her user profile which can be stored in the user data repository 128. Similarly, user preferences can be automatically identified and stored in the repository.

In some embodiments, dynamic information or activities such as user interactions (social interactions), relationships with other users, user connections, social records, social history records, and/or any communication records can be recorded and stored in the user data repository 128. In this manner, the dynamic user data essentially tracks the electronic actions that a user performs within the social networking environment. Examples of dynamic information include, but are not limited to, indications that a user would like to meet another user, indications that a user liked something, indications that a virtual gift was sent or received, indications that a wink was sent or received, and/or indications that a user tagged another user or was tagged by another user. Any electronic action that a user can take within the social network comprises dynamic user data. The user data repository 128 is shown as a discrete component in the example of FIG. 1; however, in some embodiments, the user data repository 128 may be included in the host server 124. Additionally, in some embodiments, the user data repository and/or the host server 124 may be both physically and/or functionally distributed.

In one embodiment, the host server 124 is configured to facilitate social exploration in the web-based social networking environment 100. The host server 124 facilitates the social exploration by generating automated social interactions for users 105 in the social networking environment 100. The social interactions can be displayed and/or otherwise presented to users 105 via user interfaces 104. Examples of the social interactions generated for users of the social network are illustrated and discussed in greater detail with respect to FIG. 6A-C.

In one embodiment, some of all of the functionally described herein with respect to the host server 124 can be alternatively or additionally performed, in whole or in part, at one or more of the client devices or user devices 102A-N.

Figure 2:
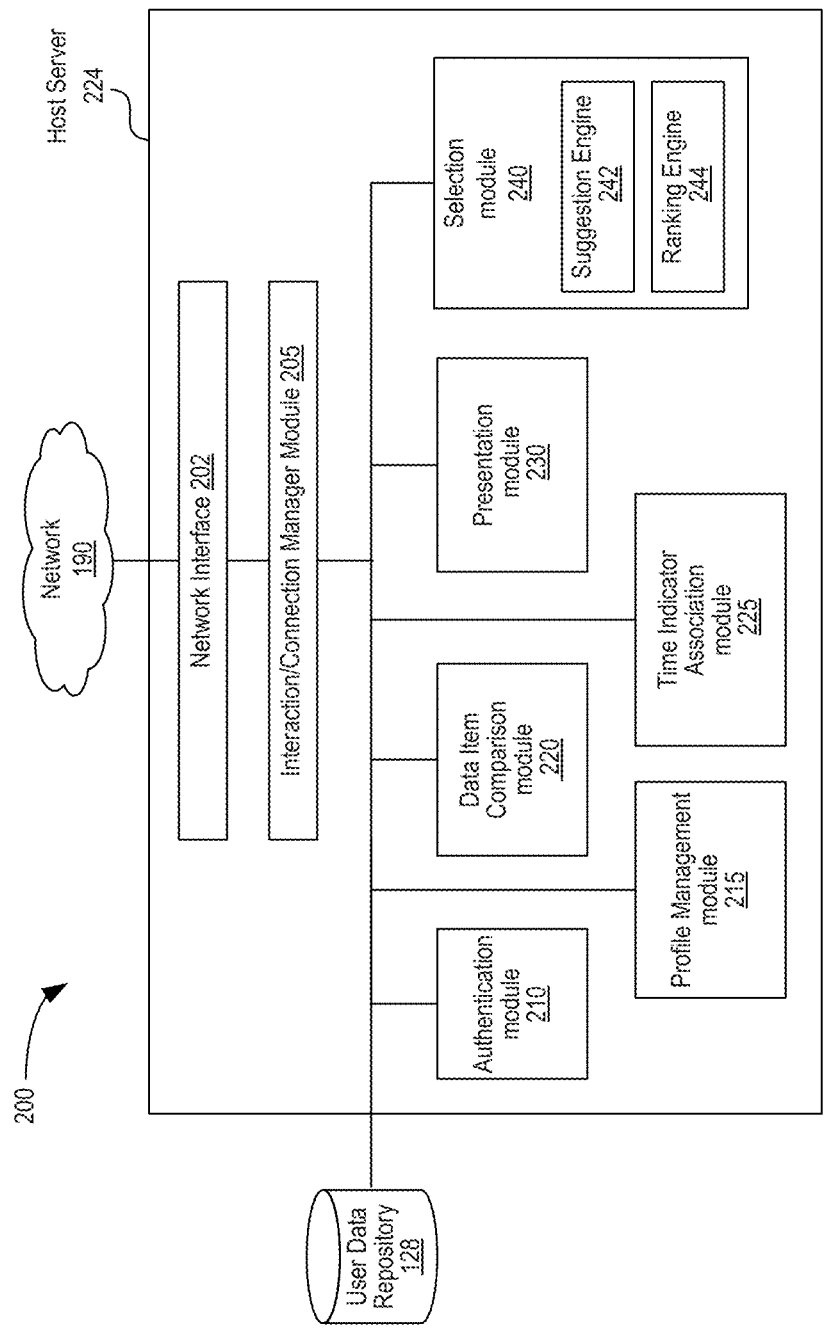
FIG. 2 depicts a block diagram of the components of a host server that generates automated social interactions in social networking environments, according to one embodiment.

FIG. 2 depicts a block diagram of the components of a host server 224 that generate automated social interactions for users in a web-based social networking environment, according to one embodiment.

The host server 224 includes a network interface 202, an interaction/connection manager module 205, an authentication module 210, a profile management module 215, a data item comparison module 220, a time indicator association module 225, a presentation module 230, and a selection module 240. In one embodiment, the host server 224 is coupled to a user data repository 128. The user data repository is described in greater detail with reference to the example of FIG. 1. Additional or less modules can be included without deviating from the novel art of this disclosure. In addition, each module in the example of FIG. 2 can include any number and/or combination of sub-modules and/or systems, implemented with any combination of hardware and/or software.

The host server 224, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 2, the network interface 202 can be a networking device that enables the host server 224 to mediate data in a network with an entity that is external to the host server, through any known and/or convenient communications protocol supported by the host and the external entity. The network interface 202 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

One embodiment of the host server 224 includes the interaction/connection manager module 205. The interaction/connection manager module 205 can be any combination of software agents and/or hardware modules able to identify, detect, track, manage, record, and/or process an occurrence of an interaction, an action, a relationship, an existing connection, and/or a requested connection. The interaction/connection manager module 205, when in operation, is able to communicate with the network interface 202 to identify and detect and/or receive data items including, but not limited to, a set of social interactions or social connection that occurred among multiple users in an online social network. In general, the social interactions that occurred in the online social network are initiated by users using client devices or user devices (e.g., a cell phone, a telephone, a SmartPhone, a PDA, an iPhone, a Blackberry, a computer, a laptop, and/or a Palmtop, etc.). Any type of connections or interactions can be detected and subsequently tracked and/or received and/or recorded for further processing and analysis. The types of connections/social connections can include relationships of various types (e.g., friendship, collegial, family, romantic, gaming, etc.) or relationships/connections of unspecified types. A connection in an online social network generally refers to users who have requested and accepted a connection request and are thus mutually connected.

The interactions/actions that occur in an online social network can include by way of example, but not limitation, sending or receiving an invitation to establish a social connection in the social network, sending or receiving a message, viewing a profile, posting a comment, posting information, joining a group, sending or receiving an invitation to an event or party, belonging to a group, creating a group, etc. The interaction/connection manager module 205 records these actions and determines the sender and recipient of these actions. If the action pertains to a group, the interaction/connection manager module 205 also determines and stores the associated group.

In one embodiment, the social interactions detected by the interaction/connection manager module 205 also includes sending a notification of interest, receiving a notification of interest, and/or responding to a notification of interest. For example, a notification of interest may be sent to a relevant user identified for a particular user when the particular user has indicated interest. The relevant user may respond to the notification if also interested in the particular user. Note that the notifications of interest sent to the particular user may be anonymous or non-anonymous. More specific examples of notifications of interest can include, but are not limited to, indications that a user would like to meet another user, indications that a virtual gift was sent or accepted, indications that a wink was sent or accepted, and/or indications that a user tagged another user. These interactions (also referred to as actions herein) are also tracked by the interaction/connection manager module 205.

In one embodiment, the interaction/connector module 205 determines the date/time of the occurrence of the event and stores the timestamp associated with the occurrence. The date and/or time associated with the occurrence of the event is used in the generation of the social timelines which illustrate the temporal relationships between various events (i.e., data items) associated with two or more users and graphically illustrates these relationships to one or more of the two or more users.

One embodiment of the host server 224 includes the authentication module 210. The authentication module 210 can be any combination of software agents and/or hardware components able to manage and register users of host server 224. For example, the authentication module 210 is configured to register new users with the system and/or create new accounts with the host server 224. During registration the user can provide, among other things, login credentials. The authentication module 210 is configured to authenticate the users as they access the host server 224 from a variety of devices. In some embodiments, authentication occurs by associating a user's username and password with an existing user account. Unauthorized users can be directed to register with the system.

One embodiment of the host server 224 includes the profile management module 215. The profile management module 215 can be any combination of software agents and/or hardware components able to control and manage modifications to user profiles. For example, a user can periodically update his/her user profile which can be stored in the user data repository 128. The user profile can include a variety of personal information describing the user. Some of this information can be public information that other users can view and some of the information can be private. Likewise some information in a users profile may be viewable some users but not by others. For example, social connections or friends of the user may be able to view the user's profile while non-social connections are not able to view the user's profile.

One embodiment of the host server 224 includes the data item comparison module 220. The data item comparison module 220 can be any combination of software agents and/or hardware components able to access data items in the user data repository 128 and/or in the interaction/connection manager module 205 and to process the plurality of data items and determine which data items are common (e.g., the same or similar). The data item comparison module 220, when in operation, is able to communicate with the interaction/connection manager module 205 and/or the user data repository 128 to access the data items. As discussed, the data items can include, but are not limited to, social connections and/or social history records, etc.

In one embodiment, the data item comparison module 220 compares a first set of data items of a plurality of sets data items in the user data repository 128 to other sets of data items of the plurality of data items in the user data repository 128 to identify commonalities between the first set of data items and the other sets of data items. In this example, the first set of data items is associated with a first user of the plurality of users and the other sets of data items are associated with other users of the plurality of users.

The data item comparison module 220 may take any number of factors and/or parameters into account when determining the interaction between the various events. For example, if two users indicated in their profiles that they lived or worked at the same place, then the data item comparison module 220 will determine that these events are common. In some embodiments, the data item comparison module 220 determines that the events are the same if they occur within some threshold. For example, in the case of two users indicating in their profiles that they lived or worked at the same place, the data item comparison module 220 may determine that they are the same or similar event if the two geographical areas are within twenty-five miles of one another. In one embodiment, users can specify and/or adjust certain thresholds and parameters defined in the data item comparison module 220.

In one embodiment, the data item comparison module 220 also compares the associated time indicators prior to making a determination that the events (or actions) are common. For example, the events may be valid during specified time period and the data item comparison module 220 may consider the events common only if the events are the same or similar and have overlapping time periods. Continuing with the example above wherein two users indicate in their profiles that they lived or worked at the same place, the data item comparison module 220 will compare these two geographical areas and if they are the same (or a similar area) and if they have overlapping time indicators (or periods) during which they are valid then the data item comparison module 220 will mark them as common events (or data items). For example, if user A indicates that he/she has lived in San Francisco from 1997-Present and user B indicates that he/she lived in San Francisco from 2008-2010, then the data item comparison module 220 determines that these events are common for the period from 2008-2010. In one embodiment, the data item comparison module 220 marks and/or saves an indication of the common event and the overlapping time period.

One embodiment of the host server 224 includes the time indicator association module 225. The time indicator association module 225 can be any combination of software agents and/or hardware components able to receive data items from the user data repository 128 and/or the interaction/connection manager module 205, determine whether the data items have time indicators included with them, determine time indicators for the activities if time indicators are not included, associate the time indicator with the activities, and/or store the activities associated with the associated time indicators. Unlike the interaction/connection manager module 205 which can determine the date/time of the occurrence of the event, the time indicator association module 225 determines if the event (or data item) already includes a time indicator that identifies a time period during which the associated event is/was valid. For example, a user may modify his/her personal profile information to indicate an event (e.g., working at a specific place) and include with the event a time indicator (e.g., 2008 or a time period 2007-2008). Similarly, a time indicator can indicate an ongoing event with an ongoing time period (e.g., 2007-present). Examples of operation of the time indicator association module 225 are discussed in greater detail with reference to FIG. 3.

One embodiment of the host server 224 includes a presentation module 230. The presentation module 230 can be any combination of software agents and/or hardware modules able to present an indication of one or more electronic social interactions to a client device for electronic presentation to a user. In one embodiment, the presentation module 230 is coupled to the selection module 240 and the user data repository 128. When in operation, the presentation module 230 identifies an active user and presents the selected or suggested indication of electronic social interactions to the client device for electronic presentation to the user. The user device may be, for example, a computer, laptop, cell phone, Blackberry, iPhone, etc. The presented timeline information can include images, and/or textual information, and/or time descriptors for the social timeline.

One embodiment of the host server 224 includes the selection module 240. The selection module 240 can be any combination of software agents and/or hardware components able to automatically select, for a first user associated with a first set of data items, a second user associated with a second set of data items and a first electronic social interaction for the first user to pursue with respect to the second user. The second user and the first electronic social interaction for the first user to pursue with respect to the second user can be selected, for example, based on the second set of data items having one or more data items that are common to the first set of data items associated with the first user. In this case, the selected or second user is not a social connection of the first user, and thus, the host server facilitates social exploration in the web-based social network. The selection module 240, when in operation, is able to communicate with the data item comparison module 220 to identify and detect and/or receive data items that are common to two or more users.

In one embodiment, the selection module 240 includes a suggestion engine 242 and a ranking engine 244. The suggestion engine 242 is configured to generate and/or select one or more suggested electronic social interactions for the first user to pursue with respect to the second user. As discussed above, the one or more suggested social interactions may be selected based on the commonalities between the first user and the second user. For example, if a first user likes the San Francisco Giants and the second user also likes the San Francisco Giants then the selection module may select a first electronic social interaction comprising a social connection request for the first user to purse with respect to the second user.

The ranking engine 244 is configured to apply a weight to each data item based on the associated data item type, compare the first set of data items to the other sets of data items of similar type, and rank the other users associated with the other sets of data items based on commonalities between the first set of data items and the associated weights for each data item type. It is appreciated that in some embodiments, the comparison is completed with the help of or entirely by the data item comparison module 220. Among other things, the types of data items can include, but are not limited to, profile information associated with a user, messages sent and/or received by the user, and/or actions taken by or acted upon a user.

Figure 3:
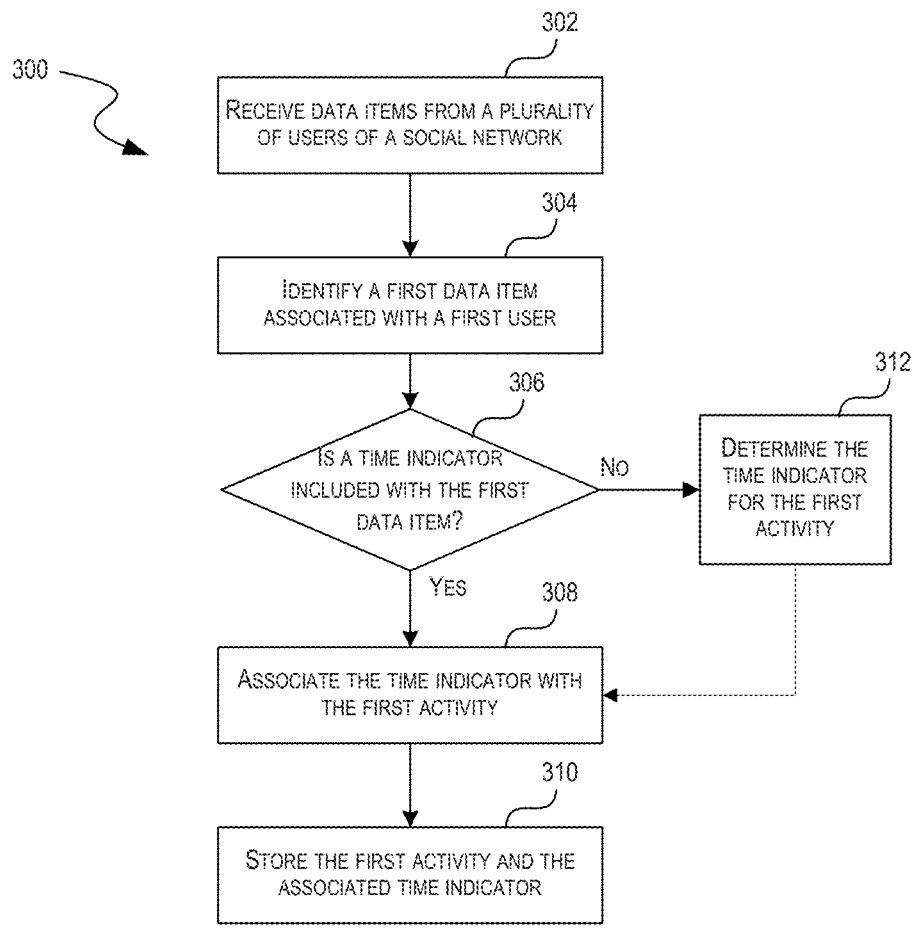
FIG. 3 depicts a flow diagram illustrating an example process for managing received data items from a plurality of users of a web-based social networking environment, according to one embodiment.

FIG. 3 depicts a flow diagram illustrating an example process 300 for managing data items received from a plurality of users of a web-based social networking environment such as, for example web-based social networking environment 100 of FIG. 1, according to one embodiment.

The operations or steps illustrated with respect to FIG. 3 are discussed with respect to operation of a host server such as, for example, host server 124 of FIG. 1. However, the operations or steps may be performed in various embodiments by a mobile device, such as, for example, client device or user device 102 of FIG. 1, one or more processors, and/or other components, modules, engines, or tools discussed herein. Additional or fewer data flow operations are possible.

As discussed above, in some embodiments, time indicators associated with data items can be used in certain circumstances when comparing data items and/or sets of data items of the plurality of data items received at the host server.

In process 302, the host server receives data items from a plurality of users of a social network. For example, the host server may receive data items including, but not limited to, a set of social interactions or social connection that occurred among multiple users in an online social network. In general, the social interactions that occurred in the online social network are initiated by users using client devices or user devices (e.g., a cell phone, a telephone, a SmartPhone, a PDA, an iPhone, a Blackberry, a computer, a laptop, and/or a Palmtop, etc.). As discussed, any type of connections or interactions (or actions) can be detected and subsequently tracked and/or received and/or recorded for further processing and analysis.

As discussed above, each of the social interactions that occurs in the online social network is initiated by a user. In process 304, the host server identifies a first data item associated with a first user. In process 306, the host server determines whether a time indicator is included with the first identified data item. Time indicators may be included with a data item in cases where a time period associated with the activity is relevant such as, for example, when a user modifies profile information that relates to areas or regions in where a user currently or previously lived or worked. Examples of user profile information that includes one or more time identifiers is discussed in greater detail above, with respect to FIGS. 7A-7B and FIG. 8. If a time indicator is not associated with the first data item then, in process 312, the host server determines a time indicator for the first data item. For example, a time of occurrence of the data item or activity may be identified or determined as the proper time indicator for the first data item.

Once the data item has been determined, or if a time indicator is already included with the first data item then, in process 308, the host server associates the time indicator with the first activity. Lastly, in process 310, the host server stores the first activity and the associated time indicator. For example, the host server can store the first activity and the associated time indicator in a user data repository such as, for example, the user data repository 128 of FIG. 1.

Figure 4A:
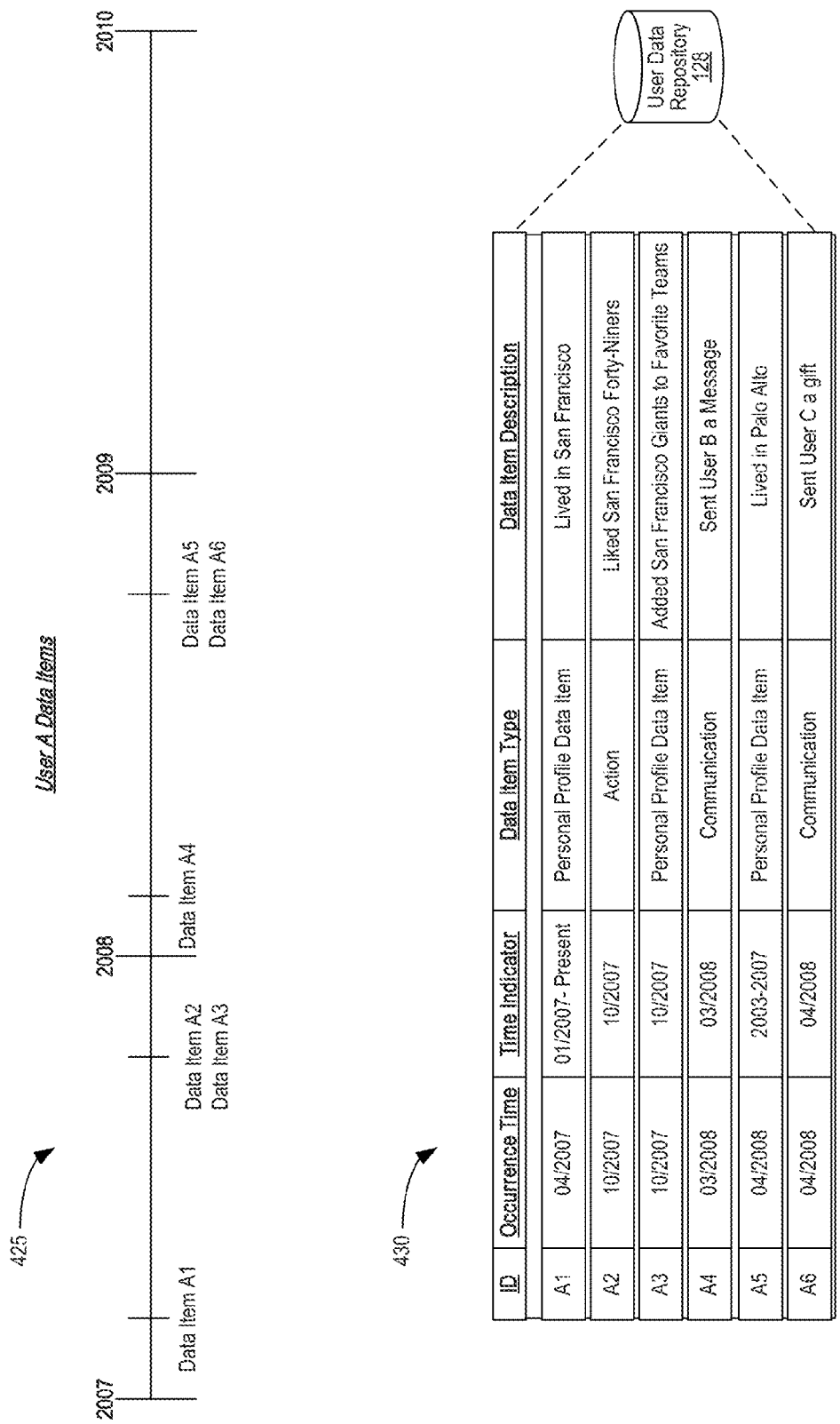
FIG. 4A and FIG. 4B depict diagrams illustrating examples of operation of a host server in processing incoming data items initiated by a first user A and a second user B, respectively, according to one embodiment.
Figure 4B:
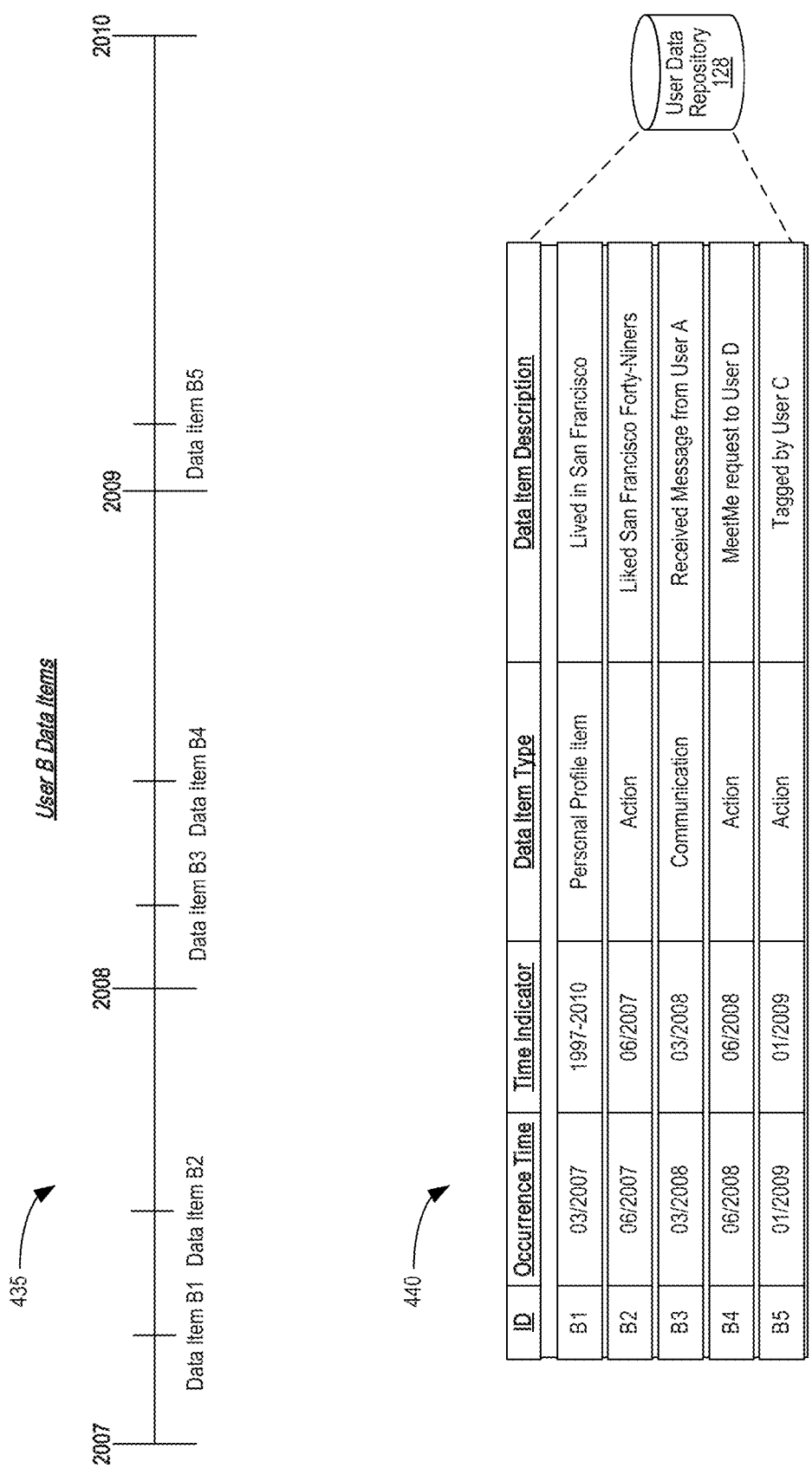

FIG. 4A and FIG. 4B depict diagrams illustrating examples of operation of a host server in processing incoming data items initiated by a first user A and a second user B, respectively. Referring first to FIG. 4A, which illustrates an example of incoming data items initiated by a first user A and storing the data items in a user data repository such as, for example, the user data repository 128 of FIG. 1. The stored data items associated with user A may comprise a set and described herein.

The example illustrated in FIG. 4A includes a graphical representation of the occurrence times of various data items associated with a first user A that were received by a host server such as, for example, the host server 124 of FIG. 1. The example of FIG. 4A includes a time interval 425 and an example table 430 illustrating how the data items initiated by the first user A can be stored, according to one embodiment. The time interval 425 illustrates data items that are received during a time interval period starting in the year 2007 and ending in the year 2010. It is appreciated that the time interval period and the data items associated with the user A, as shown, are for illustrative purposes only.

The host server may receive any number of data items during any given time intervals. In the example of FIG. 4A, six data items A1-A6 associated with or initiated by the first user A are received by the host server at various times within the time interval 425. When a data item is received, the host server determines if a time indicator is included and, if not, the data item is associated with the occurrence time of the data item. Otherwise, if a time indicator is included, as is the case with data item A1 and data item A5, then the included time indicator is associated with the data item. The data item and the associated time indicator is subsequently stored in the user data repository 128, as shown in table 430.

In the example of FIG. 4A, the table 430 also includes a data item type column. The data item type column indicates the type of data item received by the host server. In some embodiments, the host server makes the data item type determination. In other cases, the data item itself includes an indication of the data item type. As shown, the data items A1-A6 include data item types including: personal profile data items, actions, and communications; however, it is appreciated that other types of data items could also be used in the system.

Referring now to FIG. 4B, which illustrates an example of incoming data items initiated by a second user B and storing the data items in a user data repository such as, for example, the user data repository 128 of FIG. 1. The example illustrated in FIG. 4B includes a graphical representation of the occurrence times of various data items associated with a second user B that were received by a host server such as, for example, the host server 124 of FIG. 1. The example of FIG. 4B includes a time interval 435 and an example table 440 illustrating how the data items initiated by the second user B can be stored, according to one embodiment. The time interval 435 illustrates data items that are received during a time interval period starting in the year 2007 and ending in the year 2010. It is appreciated that the time interval period and the data items associated with the user B, as shown, are for illustrative purposes only.

The host server may receive any number of data items during any given time intervals. In the example of FIG. 4B, five data items B1-B5 associated with or initiated by the second user B are received by the host server at various times within the time interval 435. When a data item is received, the host server determines if a time indicator is included and, if not, the data item is associated with the occurrence time of the data item. Otherwise, if a time indicator is included, as is the case with data item B1, then the included time indicator is associated with the data item. The data item and the associated time indicator is subsequently stored in the user data repository 128, as shown in table 440.

In the example of FIG. 4B, the table 440 also includes a data item type column. The data item type column indicates the type of data item received by the host server. In some embodiments, the host server makes the data item type determination. In other cases, the data item itself includes an indication of the data item type. As shown, the data items B1-B5 include data item types including: personal profile data items, actions, and communications; however, it is appreciated that other types of data items could also be used in the system.

FIG. 5 depicts a table 500 illustrating commonalities between the first set of data items associated with a first user A and the second set of data items associated with a second user B. More specifically, table 500 illustrates an example of a set of data items that are common to both a first user A and a second user B. In this example, time indicators are taken into account in determining the common data items; however, it is appreciated that the time indicators may be ignored or weighted by the host system when comparing sets of data items associated with first and second users, respectively. A host server such as, for example, the host server 124 of FIG. 1 processes the data items associated with the first user A (i.e., the data items as received in FIG. 4A) and the data items associated with the second user B (i.e., the data items as received in FIG. 4B) to identify the first set of data items that are common to both the first user A and the second user B.

In one embodiment, the processing comprises comparing a first set of data items associated with user A to other sets of data items associated with other users (e.g., a second set of data items associated with user B) to identify commonalities between the first set of data items and the other sets of data items.

In one embodiment, the processing is initiated by the first user A sending a message for delivery to the host server indicating that he/she has an interest in exploring commonalities with other users. In other embodiments, the processing may be initiated automatically by the host server or even by the second user B who may indicate that he/she has an interest in having this determination of commonalities computed and made available for display to other users of the web-based social network.

In one embodiment, the set of data items that are common to both the first user A and the second user B have overlapping time indicators. For instance, in the example of FIG. 5, the host server has identified three common data items between the first user A and the second user B. The first set of items may indicate the underlying data items associated with the first user A and the second user B that were compared to result in the common data items. In this case, the first common data item (i.e., "A1/B1") is the result of comparing data item A1 of FIG. 4A and data item B1 of FIG. 4B. The host server determines the overlapping time indicator for the first common data item to be the time period from 2007 to 2010.

As shown in the example of FIG. 5, the first common data item A1/B1 has a personal profile item data type, the second common data item A2/B2 has an action data type, and the third common data item A4/B3 has a communication data type. As discussed, in some embodiments, the host server applies a weight to each data item based on the associated data item type, compares the first set of data items to the other sets of data items of similar type, and ranks the other users associated with the other sets of data items based on commonalities between the first set of data items and the associated weights for each data item type. For simplicity of discussion, the only other user in this example is the second user B, and thus the second user B is ranked "1." Although only one set of common data items is shown in FIG. 5, it is appreciated that any number of users can be compared and ranked by the host system.

Once a user is selected (i.e., the second user B), the host server detmines a suggested electronic social interaction for the first user A to pursue with respect to the second user B based on the identified commonalities between the first set of data items and the second set of data items. In some embodiments, the host server can also use the associated weights for each data item type when determining the suggested electronic social interaction.

Figure 6A:
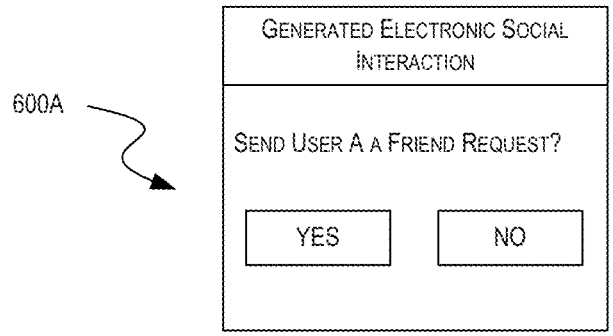
FIGS. 6A-C illustrate examples of social interactions that can be generated by a host server for one or more users of a social network, according to an embodiment.
Figure 6B:
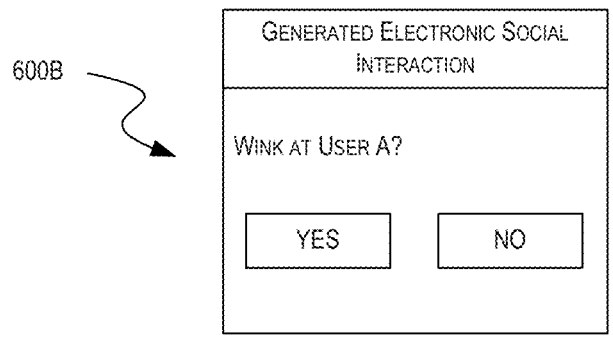
Figure 6C:
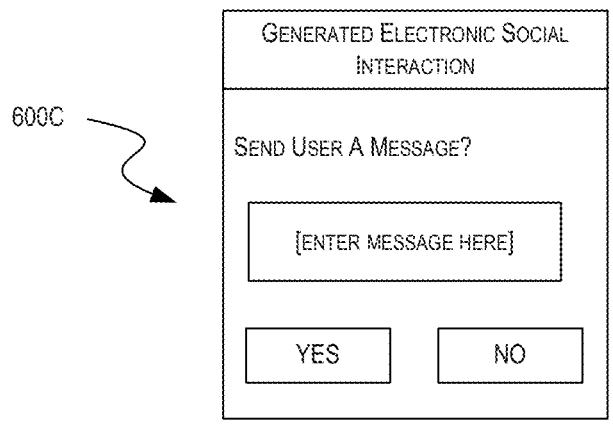

FIGS. 6A-C illustrate examples of suggested social interactions 600A-C that can be generated by a host server for one or more users of a social network, according to an embodiment. As discussed, a host server such as, for example, the host server 124 of FIG. 1, can generate the suggested social interactions 600A-C for a first user to pursue with respect to the second user, which is not yet a social connection of the first user.

Referring first to FIG. 6A, which depicts an example of a suggested social interaction 600A, according to an embodiment. The suggested social interaction 600A illustrates an example of a suggested social connection request that is determined by the host server based on the identified commonalities between a first set of data items associated with a first user and a second set of data items associated with a second user. The host server sends a query with an indication of the suggested social interaction 600A to a first client device for electronic presentation to the first user. In one embodiment, the first user responds to the query indicating that the first user intends to pursue the first electronic social interaction with respect to the second user and sends the response to the host system. The host system subsequently receives the response and sends the suggested electronic social interaction to a second client device for electronic presentation to the second user.

FIGS. 6B and 6C depict two more examples of suggested social interactions 600B and 600C. More specifically, suggested social interaction 600B comprises a suggestion for a first user to wink at a second user and suggested social interaction 600C comprises a suggestion for the first user to send a message to a second user.

FIG. 7A and FIG. 7B illustrate example user interfaces showing a user-profile page (or pane) 700A for entering personal history and user-profile page (or pane) 700B for entering professional history, respectively. The user-profile pages 700A can be displayed to a user when, for example, the user selects a personal history tab 705 to modify his/her personal profile. Similarly, the user-profile page 700B can be displayed to a user when, for example, the user selects a professional history tab 706. In the example of FIG. 7A, a personal history page (or pane) is shown including a geography section 710 and an interests section 715. In the example of FIG. 7B, a professional history page (or pane) is shown including a work history section 720 and an education section 725. From these profile pages (or panes), a user can view, edit, select, and/or modify personal profile information.

FIG. 8 illustrates an example user interface showing a user-profile page 800, according to one embodiment. The user-profile page 800 can be displayed when a user logs on to the online social network and/or when a user selects a profile button such as, for example, profile button 802. The user-profile page also includes the user's status update field 804. The user's profile information can be shown and edited via various fields 806 and 808. In fields 806, the user's biographical information can be shown and/or edited. In fields 808, the user's interest and hobbies can be shown and/or edited. For example, the user can provide information relating to favorite music types and artists, favorite movies, favorite TV shows, favorite books, favorite sports, and other interests.

In the example shown, the user is able to access various features and services offered in the social network using the options provided in tab 802. In addition, the user may upload a photograph. For example, the options in tab 802 include selections allowing the user to access the home page, edit the profile, view friends, and/or review messages, etc.

When the user edits any of the various fields 806 and/or 808 and selects save, one or more new data items are sent to the host server for processing and saving as discussed herein.

Figure 9A:
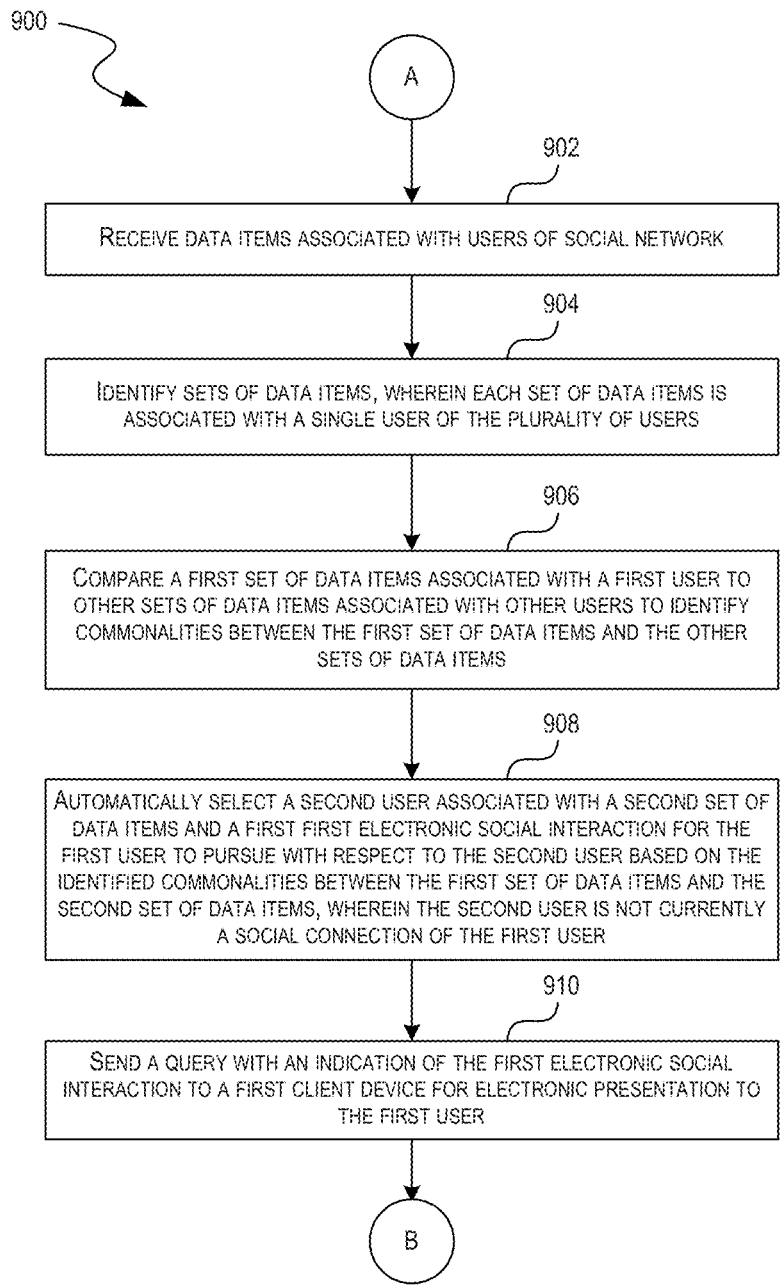
FIG. 9A and FIG. 9B depict a flow diagram illustrating an example process for generating automated social interaction in social networking environments, according to one embodiment.
Figure 9B:
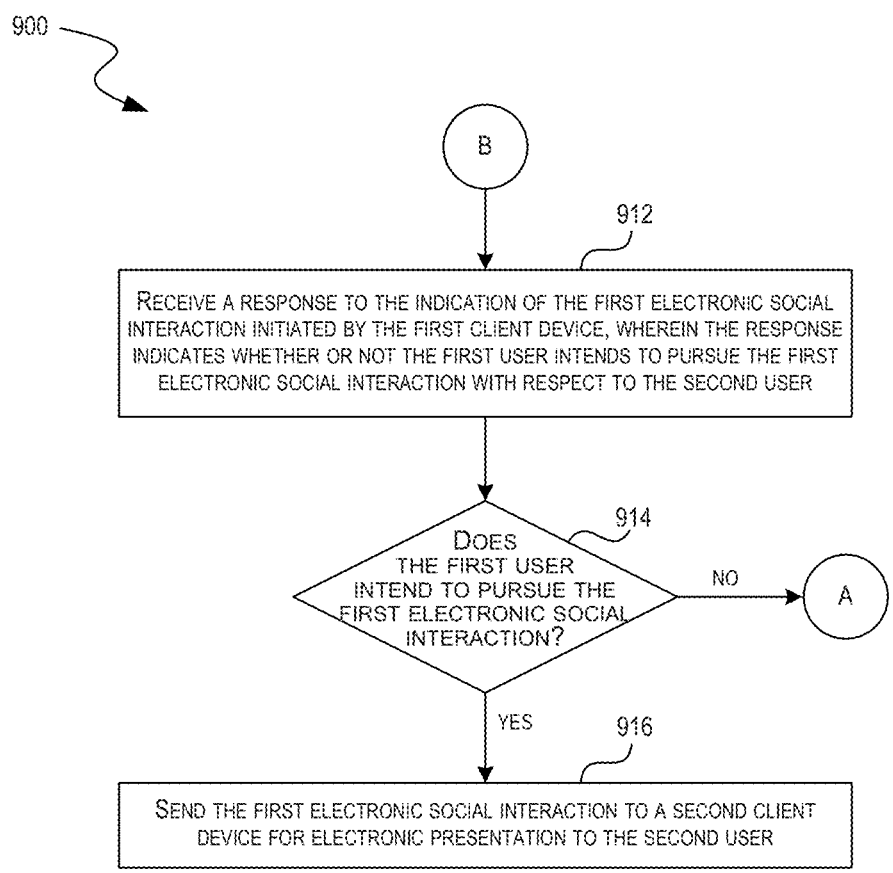

FIG. 9A and FIG. 9B depict a flow diagram illustrating an example process 900 for generating automated social interactions in a web-based social networking environment such as, for example web-based social networking environment 100 of FIG. 1, according to one embodiment.

The operations or steps illustrated with respect to FIG. 9A and FIG. 9B are discussed with respect to operation of a host server such as, for example, host server 124 of FIG. 1. However, the operations or steps may be performed in various embodiments by a mobile device, such as, for example, client device or user device 102 of FIG. 1, one or more processors, and/or other components, modules, engines, or tools discussed herein. Additional or fewer data flow operations are possible.

Referring first to FIG. 9A, in process 902, the host server receives data items associated with users of a social network. For example, the host server may receive data items upon request from a user data repository such as, for example, the user data repository 128 of FIG. 1. Alternatively or additionally, the host server can receive the data items directly from an interaction/connection manager module such as, for example, the interaction/connection manager module 205 of FIG. 2. In one embodiment, the host server may monitor the received data items.

As previously discussed, one or more of the plurality of data items may comprise a social interaction between the users and/or a modification to profile information associated with one of the plurality of users of the web-based social network. Further, in some instances, the modification to the profile information indicates a geographical area including an associated time indicator.

In process 904, the host server identifies a plurality of sets of data items of the plurality of data items. In this example, each set of the plurality of sets of data items is associated with a single user of the plurality of users.

In process 906, the host server compares a first set of data items of the plurality of sets data items to other sets of data items of the plurality of data items to identify commonalities between the first set of data items and the other sets of data items. The first set of data items is associated with a first user of the plurality of users and the other sets of data items are associated with other users of the plurality of users.

For example, a first set of data items associated with a first user may be compared to a second set of data items associated with a second user to determine whether the first data set of data items and the second set of data items have one or more data items that are the same or similar. A data item may be the same or similar between a first and second user if, for example, the first user sends a message to the second user. In this case, the first data item associated with the first user corresponds to sending the message to the second user and the second data item associated with the second user corresponds to the second user receiving the message from the first user. Additionally, the sent message and the received message occur at the same or similar time, and thus the first and second time periods overlap.

Alternatively or additionally, the first set of data items associated with the first user may be compared to the second set of data items associated with the second user to determine whether the first data set of data items and the second set of data items have one or more data items that fall within a pattern or relationship. For example, certain data items might be complementary although not the same or similar.

In another example, if the first user indicates via a personal profile that he/she has lived in San Francisco from 1997-Present and the second user indicates that he/she has lived in San Francisco from 2008-2010, then the host server can determine that the first user and the second user have lived in a common geographical area. Thus, the first data item (i.e., the first user living in San Francisco) and the second data item (i.e., the second user living in San Francisco) are the same or similar. However, in some embodiments, the host server may also take into account wherein the first data item and the second data item have overlapping time periods.

In process 908, the host server automatically selects a second user associated with a second set of data items of the plurality of sets of data items and a first electronic social interaction for the first user to pursue with respect to the second user based on the identified commonalities between the first set of data items and the second set of data items. In this case, the second user is not currently a social connection of the first user, and thus process 900 facilitates social exploration in the web-based social network.

In process 910, the host server sends a query with an indication of the first electronic social interaction to a first client device for electronic presentation to the first user. In some embodiments, prior to sending the query to the client device, the host server receives an indication that the first user wants to explore commonalities or common data items with the second user; however, as discussed above, the host server may perform the commonality analysis automatically.

The flow diagram illustrating the example process 900 for generating automated social interactions in a web-based social networking environment continues in FIG. 9B. In process 912, the host server receives a response to the query, wherein the response indicates whether or not the first user intends to pursue the first electronic social interaction with respect to the second user.

In process 914, the host server determines if the user intends to pursue the first electronic social interaction. If so, in process 916, the host server sends the first electronic social interaction to a second client device for electronic presentation to the second user. In one embodiment, the first electronic social interaction is sent to the second client device responsive to receiving the response to the query. However, if the host server determines that the user does not intend to pursue the first electronic social interaction, then example process returns to process 902.

Figure 10:
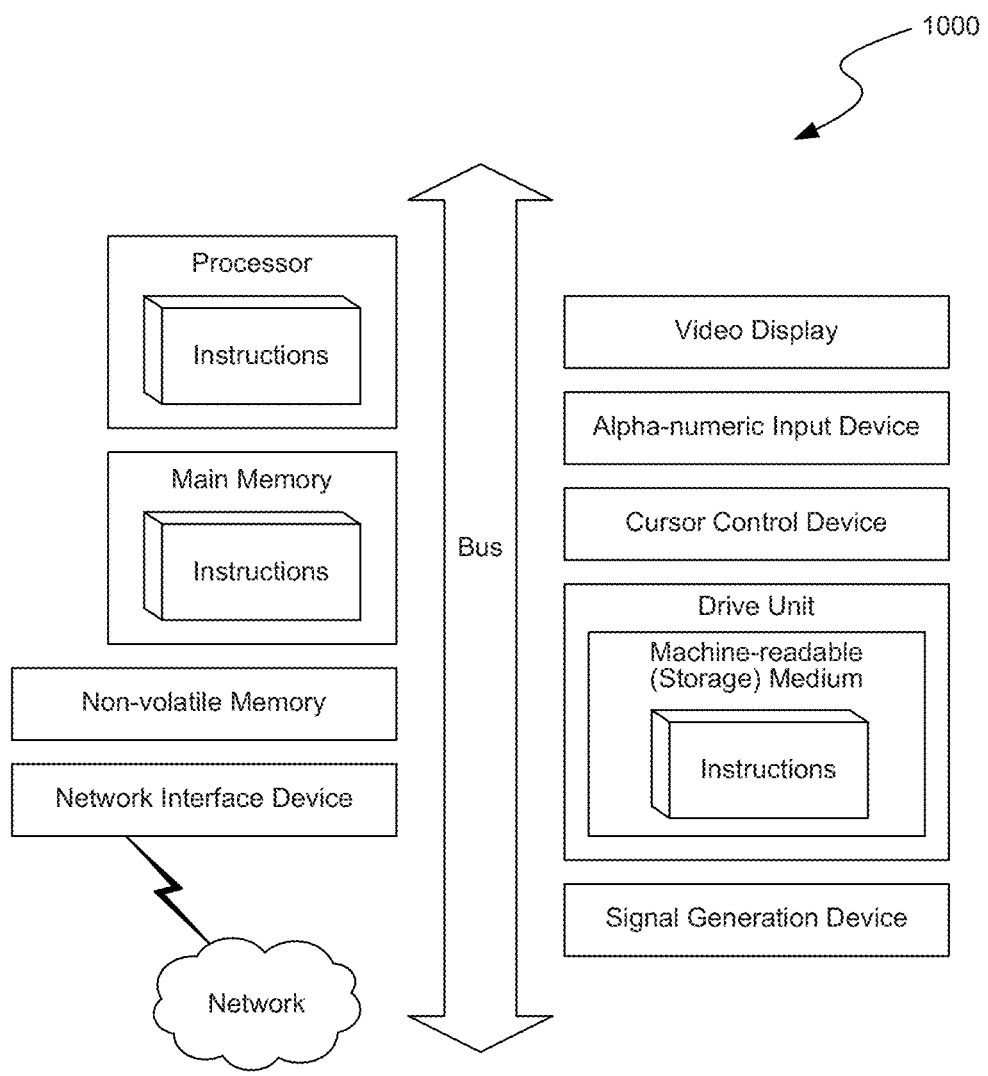
FIG. 10 shows a diagrammatic representation of a machine in the example form of a computer system within which a set of instructions, for causing the machine to perform any one or more of the methodologies discussed herein, may be executed, according to one embodiment.

FIG. 10 shows a diagrammatic representation of a machine in the example form of a computer system 1000 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A computer implemented method of facilitating social exploration in a web-based social network, the method comprising:

receiving, at a host server, a plurality of data items associated with a plurality of users of the web-based social network;

identifying, at the host server, a plurality of sets of data items of the plurality of data items, wherein each set of the plurality of sets of data items is associated with a single user of the plurality of users;

comparing, at the host server, a first set of data items of the plurality of sets of data items to other sets of data items of the plurality of sets of data items to identify commonalities between the first set of data items and the other sets of data items, wherein the first set of data items is associated with a first user of the plurality of users and the other sets of data items are associated with other users of the plurality of users, the comparing including:

determining a first time indicator associated with a first specified data item of the first set of data items, the first time indicator indicating a time period during which the first specified data item is valid, comparing the first time indicator with a second time indicator associated with a second specified data item of a second user of the plurality of users who is not a social connection of the first user, the second specified data item being one of a second set of data items associated with the second user, the second set of data items being one of the other sets of data items, the second time indicator indicating a time period during which the second specified data item is valid, determining that the first specified data item and the second specified data item are common as a function of the first time indicator and the second time indicator;

automatically selecting, at the host server, the second user and a first electronic social interaction for the first user to pursue with respect to the second user based on the identified commonalities between the first set of data items and the second set of data items; and sending, from the host server, a query with an indication of the first electronic social interaction to a first client device for electronic presentation to the first user.

2. The method of claim 1, further comprising:

receiving, at the host server, a response to the query indicating that the first user intends to pursue the first electronic social interaction with respect to the second user.

3. The method of claim 2, further comprising:

sending, from the host server, the first electronic social interaction to a second client device for electronic presentation to the second user responsive to receiving the response to the query.

4. The method of claim 1, wherein the first electronic social interaction comprises a social connection request.

5. The method of claim 1, wherein the first electronic social interaction comprises one or more of an electronic text-based message, a request to meet, a virtual gift, a wink, or a tag.

6. The method of claim 1, wherein one or more of the data items comprises a modification to profile information associated with one of the plurality of users of the web-based social network.

7. The method of claim 6, wherein comparing the first set of data items of the plurality of sets of data items to other sets of data items of the plurality of data items to identify commonalities between the first set of data items and the other sets of data items further comprises comparing both public and private profile information.

8. The method of claim 1, wherein each data item of the plurality of data items is initiated by an associated user.

9. The method of claim 1, wherein each data item of the plurality of data items has an associated data item type.

10. The method of claim 9, further comprising:
applying, at the host server, a weight to each data item based on the associated data item type; and
comparing, at the host server, the first set of data items to the other sets of data items of similar type; and
ranking, at the host server, the other users associated with the other sets of data items based on commonalities between the first set of data items and the associated weights for each data item type.

11. The method of claim 9, wherein the second user associated with the second set of data items is selected at the host server user based on the rankings.

12. The method of claim 9, further comprising:
ranking, at the host server, electronic social interactions for the first user to pursue with respect to the second user; and
wherein, the first electronic social interaction for the first user to pursue with respect to the second user is selected at the host server based on the rankings.

13. A computer implemented method of facilitating social exploration in a web-based social network, the method comprising:
receiving, at a host server, a plurality of data items associated with a plurality of users of the web-based social network;
identifying, at the host server, a first set of data items of a plurality of data items and a second set of data items of the plurality of data items, the first set of data items associated with a first user and the second set of data items associated with a second user;
comparing, at the host server, the first set of data items and the second set of data items to identify a third set of data items that are common to the first user and the second user, the comparing including:
determining a first time indicator associated with a first specified data item of the first set of data items, the first time indicator indicating a time period during which the first specified data item is valid,
comparing the first time indicator with a second time indicator associated with a second specified data item of the second user, wherein the second user is not a social connection of the first user, the second specified data item being one of the second set of data items, the second time indicator indicating a time period during which the second specified data item is valid,
determining that the first specified data item and the second specified data item are common as a function of the first time indicator and the second time indicator;
automatically selecting, at the host server, the second user and a suggested social interaction for the first user to pursue with respect to the second user based on the third set of data items that are common to the first user and the second user; and
sending, from the host system, a query with an indication of the suggested social interaction to a first client device for electronic presentation to the first user.

14. The method of claim 13, further comprising:
receiving, at the host server, a response to the query indicating that the first user intends to pursue the suggested social interaction with respect to the second user; and
sending, from the host server, the suggested social interaction to a second client device for electronic presentation to the second user responsive to receiving the response to the query.

15. The method of claim 13, further comprising:
automatically determining, at the host server, a list of social interactions for the first user to pursue, wherein the suggested social interaction is automatically selected from the list of social interactions.

16. The method of claim 13, wherein the second set of data items includes information that is not accessible to the first user.

17. A system for facilitating social exploration in a web-based social network, the system comprising:
a processor coupled to a memory;
an interaction module configured to receive a plurality of data items associated with a plurality of users of the web-based social network;
a data item comparison module configured to identify a plurality of sets of data items from the plurality of data items, and compare a first set of data items of the plurality of sets of data items to other sets of data items of the plurality of data items to identify commonalities between the first set of data items and the other sets of data items, wherein each set of the plurality of sets of data items is associated with a single user of the plurality of users, the first set of data items being associated with a first user of the plurality of users, the data item comparison module configured to compare by:
determining a first time indicator associated with a first specified data item of the first set of data items, the first time indicator indicating a time period during which the first specified data item is valid,
comparing the first time indicator with a second time indicator associated with a second specified data item of a second user of the plurality of users who is not a social connection of the first user, the second specified data item being one of a second set of data items associated with the second user, the second set of data items being one of the other sets of data items, the second time indicator indicating a time period during which the second specified data item is valid,
determining that the first specified data item and the second specified data item are common as a function of the first time indicator and the second time indicator;
a selection module configured to automatically select the second user and a first electronic social interaction for the first user to pursue with respect to the second user based on the identified commonalities between the first set of data items and the second set of data items; and
a presentation module configured to send a query with an indication of the first electronic social interaction to a first client device for electronic presentation to the first user.

18. The system of claim 17, the system further comprising:
an interface module configured to receive a response to the query initiated by the first client device indicating that the first user intends to pursue the first electronic social interaction with respect to the second user, and send the first electronic social interaction to a second client device for electronic presentation to the second user.

19. The system of claim 17, wherein the first electronic social interaction comprises a social connection request.

20. The system of claim 17, the system further comprising:
a profile management module configured to manage modifications to profile information associated with the plurality of users of the web-based social network.

21. The system of claim 20, wherein the profile information includes public and private information.

22. A non-transitory machine-readable storage medium having stored thereon a set of instructions which when executed, causes a processor to perform a method of facilitating social exploration in a web-based social network, the method comprising:

identifying a plurality of sets of data items of a plurality of data items associated with a plurality of users of the web-based social network, wherein each set of the plurality of sets of data items is associated with a single user of the plurality of users;

comparing a first set of data items of the plurality of sets of data items to other sets of data items of the plurality of data items to identify commonalities between the first set of data items and the other sets of data items, the first set of data items being associated with a first user of the plurality of users, the comparing including:

determining a first time indicator associated with a first specified data item of the first set of data items, the first time indicator indicating a time period during which the first specified data item is valid, comparing the first time indicator with a second time indicator associated with a second specified data item of a second user of the plurality of users who is not a social connection of the first user, the second specified data item being one of a second set of data items associated with the second user, the second set of data items being one of the other sets of data items, the second time indicator indicating a time period during which the second specified data item is valid, determining that the first specified data item and the second specified data item are common as a function of the first time indicator and the second time indicator;

automatically selecting the second user and a first electronic social interaction for the first user to pursue with respect to the second user based on the identified commonalities between the first set of data items and the second set of data items; and sending a query with an indication of the first electronic social interaction to a first client device for electronic presentation to the first user.

23. The machine-readable storage medium of claim 22, the method further comprising:

sending the first electronic social interaction from the host server to a second client device for electronic presentation to the second user responsive to receiving a response to the query indicating that the first user intends to pursue the first electronic social interaction with respect to the second user.

24. A system for facilitating social exploration in a web-based social network, the system comprising:

means for receiving a plurality of data items associated with a plurality of users of the web-based social network;

means for identifying a plurality of sets of data items of the plurality of data items, wherein each set of the plurality of sets of data items is associated with a single user of the plurality of users;

means for comparing a first set of data items of the plurality of sets of data items to other sets of data items of the plurality of data items to identify commonalities between the first set of data items and the other sets of data items, wherein the first set of data items is associated with a first user of the plurality of users and the other sets of data items are associated with other users of the plurality of users, the comparing including:

determining a first time indicator associated with a first specified data item of the first set of data items, the first time indicator indicating a time period during which the first specified data item is valid, comparing the first time indicator with a second time indicator associated with a second specified data item of a second user of the plurality of users who is not a social connection of the first user, the second specified data item being one of a second set of data items associated with the second user, the second set of data items being one of the other sets of data items, the second time indicator indicating a time period during which the second specified data item is valid, determining that the first specified data item and the second specified data item are common as a function of the first time indicator and the second time indicator;

means for automatically selecting the second user and a first electronic social interaction for the first user to pursue with respect to the second user based on the identified commonalities between the first set of data items and the second set of data items; and means for sending a query with an indication of the first electronic social interaction to a first client device for electronic presentation to the first user.

* * * * *